Jan. 20, 1959 M. W. SLATE 2,870,333

SELECTABLE LONG LINES ON ROTATABLE DISC TUNED BY SHADING ELEMENTS ON ANOTHER DISC

Filed Dec. 24, 1954 2 Sheets-Sheet 1

INVENTOR.
MATTHEW W. SLATE

BY Darby & Darby
ATTORNEYS

INVENTOR.
MATTHEW W. SLATE
BY
Darby & Darby
ATTORNEYS

United States Patent Office 2,870,333

Patented Jan. 20, 1959

2,870,333

SELECTABLE LONG LINES ON ROTATABLE DISC TUNED BY SHADING ELEMENTS ON ANOTHER DISC

Matthew W. Slate, New York, N. Y., assignor to Allen B. Du Mont Laboratories, Inc., Clifton, N. J., a corporation of Delaware Application December 24, 1954, Serial No. 477,521

2 Claims. (Cl. 250—40)

This invention relates to a tuning device by means of which high frequency, including ultra-high frequency circuits may be tuned over a relatively wide range.

The general object of the invention is to provide a shading form of tuner in which the circuit elements of the tuner, as distinct from the shading elements, are so constructed that the shading effects of the circuit elements on the shading elements are minimized.

Other and more detailed objects of this invention will be apparent from the following disclosure of the embodiments thereof illustrated in the attached drawings.

In those drawings—

The subject matter of this invention is related to that of the copending application of David C. Felt, Serial No. 314,851, filed October 15, 1952, which issued as Patent No. 2,807,724 on September 24, 1957; my copending continuation-in-part application Serial No. 477,473 filed December 24, 1954, which issued as Patent No. 2,832,892 on April 29, 1958; and my copending application Serial No. 477,475, filed December 24, 1954, which issued as Patent No. 2,811,698 on October 29, 1957. All of the above patents have been assigned to the assignee of the instant application.

Figure 1:
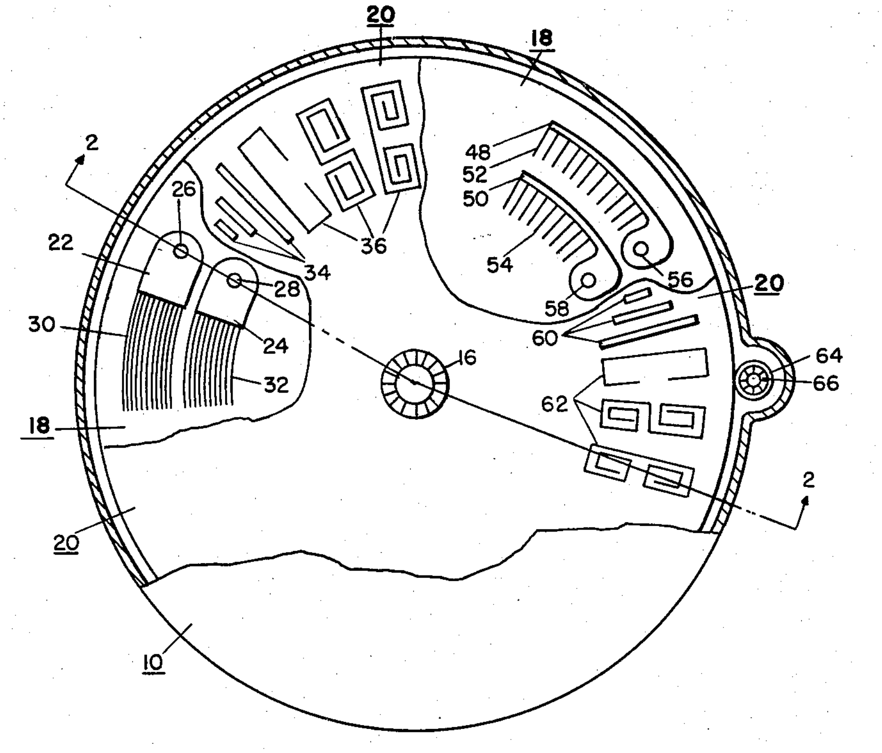
Fig. 1 is a top plan view, with parts broken away, of one form of tuning device in accordance with this invention; the part supporting the shading elements being also broken away without disturbing the positioning of the shading elements.
Figure 2:
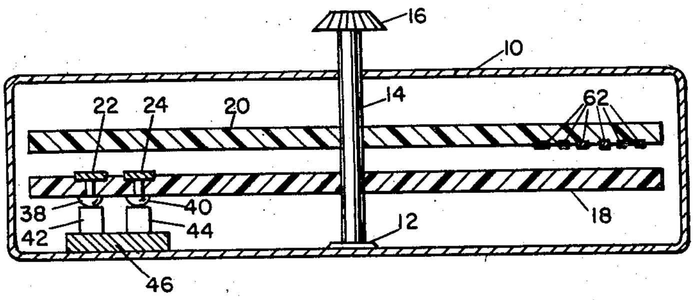
Fig. 2 is a cross-sectional view taken on line 2—2 of Fig. 1.

The device illustrated in Figs. 1 and 2 comprises a housing 10, constructed in any suitable form and of any suitable material. Within the housing is bearing 12 for the lower end of shaft 14, the upper end of which extends externally of the housing and is provided with knob 16. Within housing 10 and secured to shaft 14 is an insulative support 18, shown in the form of a disk. A second insulative support 20, also in the form of a disk, frictionally engages shaft 14 so as to be movable thereby and also movable with respect thereto. The journal in the housing is shown in Fig. 1 as a friction roller wheel 64, engaging the periphery of disk 20 and further provided with knobbed shaft 66, by which it may be turned.

With this construction, by rotating shaft 14 both disks 18 and 20 can be caused to rotate in unison. By rotating the friction roller wheel 64, disk 20 can be made to revolve with regard to disk 18, which remains stationary.

As disclosed in my continuation-in-part application referred to above, this operation can be further insured by the use of spring pressed ball detents which will serve to properly position disk 20 with respect to disk 18 for each channel to be tuned, and disk 18 with respect to channel switching mechanism to insure channel selection.

Disk 18 carries two sets of transmission line conductor pair. The first of these transmission line pairs comprises solid metal portions 22 and 24 having a plurality of fine, conductive finger-like extensions 30 and 32 respectively connected thereto. The other transmission line pair consists of solid metal portions in the form of thin, arcuate conductors 48 and 50 terminating in enlarged ends. Connected to conductors 48 and 50 are a plurality of fine, conductive finger-like, radially extending conductors 52 and 54.

As will be appreciated by those skilled in the art, these transmission line pairs (as well as the shading elements to be described) can be constructed and attached to the disk 18 in any suitable manner, preferably by printed circuit techniques. As is clear from Fig. 1, the fine, conductive fingers 30 and 32 extend circumferentially of the disk 18 while the fingers 52 and 54 extend radially.

In accordance with well known concepts in this art, the transmission line pairs of the embodiments of Figs. 1 and 2 are not necessarily limited to a length in the vicinity of one-quarter wavelength at the operating range of the circuits to which they are connected.

The first transmission line is provided with a pair of rivets 26 and 28 which extend through the support 18 and terminate in contact ends 38 and 40 (see Fig. 2). These contacts are positioned to engage a pair of fixed contacts 42 and 44 mounted on insulative support 46. The terminals of the high frequency circuit to be tuned are connected to terminals 42 and 44. Similarly, the other transmission line pair is provided with rivets 56 and 58, which also terminate in contact ends below disk 18. Thus, when disk 18 is rotated, either of two channels can be selected to provide the band switching function.

On the undersurface of the support 20 are shading element units for each transmission pair. Thus, in the case of the transmission line pair 22, 24, the unit comprises a discontinuous shading element made up of capacitive portion 34 and inductive portion 36. Portion 34 consists of a plurality of spaced conductors of the same or varying radial lengths. Inductive portion 36 consists of conductors having different numbers of turns and being wound in either aiding or bucking relation as shown.

Associated with the other transmission line pair is a shading unit similar in form and construction to those just described, having capacitive element 60 and inductive element 62.

In the operation of this device, assuming counterclockwise rotation of the support disks by shaft 14, it will be seen that either transmission line pair can be placed in circuit with fixed terminals 42 and 44 of Fig. 2. During channel selection, shading element support 20 moves with support 18. In order to tune the circuit connected to terminals 42 and 44, disk 20 is rotated relative to disk 18 in a counterclockwise direction so that the associated shading element unit is progressively moved to overlie the transmission line elements.

The major portion of the transmission line pair 22, 24 is made up of a large number of fine, closely spaced conductive fingers. If these fingers are fine enough and close enough together the capacitive coupling between them and a shading element will not be much less than in the case where these transmission line elements are solid. However, the fine finger construction reduces the shading of the inductive portion of the shading elements by the circuit elements, so as to permit the full inductance of the shading elements to be effective in decreasing the frequency. Similar results occur with respect to the other transmission line pair since the electrical results are similar although the mechanical construction is different. It will be understood that the shapes of the solid portions of the transmission line pairs can be widely varied, and the length of the fine fingers can vary as conditions require to provide a wide range of tuning characteristics. It should also be noted that fingers 30 and 32 may not necessarily all lie on the same radii, but can extend angularly, as is also true of fingers 52 and 54. Broadly speaking, the above embodiment illustrates how the capacitance and inductance can be varied by the introduction of shading elements at greater capacitance and inductance with little shading effect on the inductive portions of the shading elements.

Figure 3:
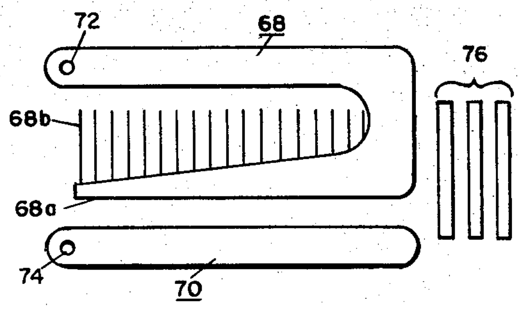
Figs. 3 and 4 are modified forms of the invention shown in somewhat diagrammatic form.
Figure 4:
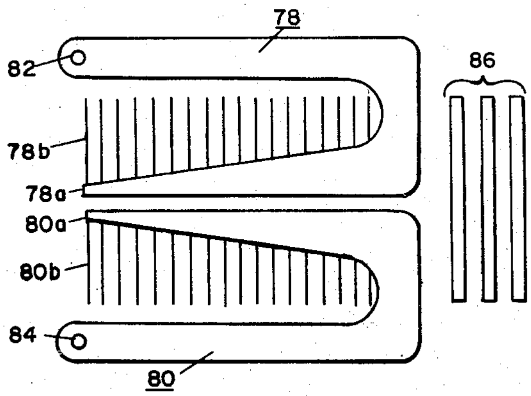

The disclosure in Figs. 3 and 4 is somewhat diagrammatic in that the insulative supports for the transmission line pairs and shading elements are not shown. Since the supports need not be disks, but can take various forms, as disclosed in the above-mentioned applications, the description in connection with these figures will assume rectilinear relative movement between the transmission line pairs and shading elements.

In Fig. 3 the elements of the transmission line pair consist of a U-shaped member and a straight member. The U-shaped member has one leg 68 of uniform width connected to another leg **68*a* of gradually decreasing width. Connected to leg 68*a* are a plurality of fine, conductive finger-like conductors 68*b*** which, in this case, are shown as of gradually decreasing length.

The other member of this transmission line pair consists of a metal strip 70 of uniform width. As in the previous cases, a pair of rivets 72 and 74 are provided to form circuit connecting contacts. The shading element unit in this case is shown as of a discontinuous member 76, composed of a plurality of metal strips of uniform length and width, although they can be of different shapes and lengths.

In tuning with this structure shading element 76 is moved from right to left (in a counterclockwise direction) to overlap transmission line conductors **68*a*, 70 and fingers 68*b*. It will be recognized by those skilled in the art that by having leg 68*a* of varying width a larger amount of inductance is introduced in the circuit than if both conductors were shaped like conductor 70. The presence of the fingers 68*b* introduces a large amount of capacitance in the circuit which can be varied by movement of shading unit 76** thereover without substantial reduction in the inductance of the shading elements. This type of construction will be recognized as useful in an unbalanced circuit.

Similar results can be obtained for a balanced circuit by the construction of Fig. 4. In this case both conductors of the transmission line pairs 78, 80 are U-shaped with their adjacent parallel legs **78*a* and 80*a* of gradually diminishing width towards their free ends. These legs are provided with laterally extending fine, conductive finger-like conductors 78*b* and 80*b* of gradually diminishing length, as shown. As before, the conductors are provided, respectively, with circuit connection or contact rivets 82 and 84. The shading unit 86 is illustrated as similar to that in Fig. 3. As shading unit 86** moves over the transmission line, the capacitance produced by the shading elements increases, with minimized reduction of the inductance of the shading elements caused by the shading effect of the circuit elements upon them, allowing shading elements of increased inductance to be effective. The added inductance affects the low frequency end of the tuning range more than the high frequency end, thereby extending the range of tuning.

The scope of the above description is such as to indicate to those skilled in the art that the subject matter of this invention is capable of considerable variation to meet various tuning range combinations and tuning characteristics. It is given, therefore, in an illustrative sense, since I prefer to be limited by the claims rather than by the illustrative examples herein given.

What is claimed is:

1. In a high frequency tuning device, a transmission line comprising a pair of conductors supported in juxtaposition in a plane, each conductor having a solid portion and a plurality of integral, fine conductors closely spaced extending angularly therefrom in said plane, and a relatively movable conductive shading element unit lying in another plane parallel to said first plane so that the shading element may be moved longitudinally above said transmission line conductors, said shading element unit comprising a plurality of capacitive and inductive elements, said inductive elements including portions wound in the same direction and portions wound in the opposite direction.

2. In a high frequency tuning device, a transmission line comprising a pair of conductors supported in juxtaposition in a plane, at least one of said conductors having a solid portion and a plurality of integral, fine conductors closely spaced extending angularly therefrom in said plane, and a relatively movable conductive shading element unit lying in another plane parallel to said first plane so that the shading element may be moved longitudinally above said transmission line conductors, said shading element unit comprising a plurality of capacitive and inductive elements, said inductive elements including portions wound in the same direction and portions wound in the opposite direction.

References Cited in the file of this patent

UNITED STATES PATENTS

| | | |
|---|---|---|
| 1,597,591 | Freese | Aug. 24, 1926 |
| 2,475,638 | Worcester | July 12, 1949 |
| 2,715,211 | Murakami | Aug. 9, 1955 |
| 2,773,989 | Nestlerode | Dec. 11, 1956 |
| 2,786,142 | Tyminski | Mar. 19, 1957 |
| 2,811,698 | Slate | Oct. 29, 1957 |

FOREIGN PATENTS

| | | |
|---|---|---|
| 166,021 | Switzerland | Feb. 14, 1937 |